United States Patent
You et al.

(10) Patent No.: US 10,776,567 B2
(45) Date of Patent: Sep. 15, 2020

(54) METHOD FOR COMPILING PAGE DATA, METHOD, DEVICE AND STORAGE MEDIUM FOR PAGE RENDERING

(71) Applicant: TENCENT TECHNOLOGY (SHENZHEN) COMPANY LIMITED, Shenzhen, Guangdong (CN)

(72) Inventors: Shun Hang You, Shenzhen (CN); Ji Sheng Huang, Shenzhen (CN); Hao Hu, Shenzhen (CN); Chao Lin, Shenzhen (CN); Hao Jun Hu, Shenzhen (CN); Xu Yu Gui, Shenzhen (CN); Hai Tian Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/343,554

(22) PCT Filed: Nov. 1, 2017

(86) PCT No.: PCT/CN2017/108909
§ 371 (c)(1),
(2) Date: Apr. 19, 2019

(87) PCT Pub. No.: WO2018/082562
PCT Pub. Date: May 11, 2018

(65) Prior Publication Data
US 2020/0050652 A1    Feb. 13, 2020

(30) Foreign Application Priority Data
Nov. 7, 2016   (CN) .......................... 2016 1 0975743

(51) Int. Cl.
*G06F 17/00*    (2019.01)
*G06F 40/14*    (2020.01)
(Continued)

(52) U.S. Cl.
CPC ............ *G06F 40/14* (2020.01); *G06F 40/117* (2020.01); *G06F 40/221* (2020.01)

(58) Field of Classification Search
CPC ....... G06F 16/972; G06F 40/14; G06F 40/221
See application file for complete search history.

(56) References Cited

U.S. PATENT DOCUMENTS 6,981,212 B1* 12/2005 Claussen ............... G06F 16/986
 715/205
6,990,653 B1*  1/2006 Burd ..................... G06F 16/972
 717/108

(Continued)

FOREIGN PATENT DOCUMENTS

CN    102520966 A    6/2012
CN    104572035 A    4/2015
(Continued)

OTHER PUBLICATIONS

International Search Report for PCT/CN2017/108909 dated Jan. 29, 2018 [PCT/ISA/210].

(Continued)

*Primary Examiner* — Scott T Baderman
*Assistant Examiner* — Barbara M Level
(74) *Attorney, Agent, or Firm* — Sughrue Mion, PLLC

(57) ABSTRACT

A page data compiling apparatus and method, the method being performed by a server, includes obtaining initial page structure data that is generated using an extended markup language, parsing the initial page structure data to generate scripting language page data comprising a page generation code and a data variable set, an input to the page generation code being a current data set that is determined according to the data variable set, and an output of the page generation code being a node tree matching the input current data set, and sending the scripting language page data to a terminal so that the terminal determines the current data set according to the data variable set, determines the matching node tree according to the current data set and the page generation (Continued)

code in the scripting language page data, and displays a page according to the node tree.

20 Claims, 12 Drawing Sheets

(51) Int. Cl.
  *G06F 40/117* (2020.01)
  *G06F 40/221* (2020.01)

(56) References Cited

U.S. PATENT DOCUMENTS

| | | | |
|---|---|---|---|
| 9,262,185 B2* | 2/2016 | Hill | G06F 9/45512 |
| 2005/0097008 A1* | 5/2005 | Ehring | G06Q 30/0639 |
| | | | 715/205 |
| 2012/0330984 A1 | 12/2012 | Fablet et al. | |

FOREIGN PATENT DOCUMENTS

| | | |
|---|---|---|
| CN | 104699706 A | 6/2015 |
| CN | 106569824 A | 4/2017 |

OTHER PUBLICATIONS

Chinese Office Action for 201610975743X dated Nov. 7, 2016.
Written Opinion dated Jan. 29, 2018 in International Application No. PCT/CN2017/108909.
Office Action dated Apr. 9, 2019 in Chinese Application No. 201610975743.X.
Gu Bing "XML Utility Technology Tutorial", Tsinghua University Press, Jan. 2007, pp. 172-177 (6 pages total).

* cited by examiner (When a name is null)
/-Tag: 'root'
\-Children: /
            |-/-Tag: 'view'
               \-Children:/
                          |-'hi! Guest!'

(When a name is 'world')
```
/-Tag: 'root'
\-Children: /
            |-/-Tag: 'view'
              \-Children:/
                         |-'hello world'
```
FIG. 13
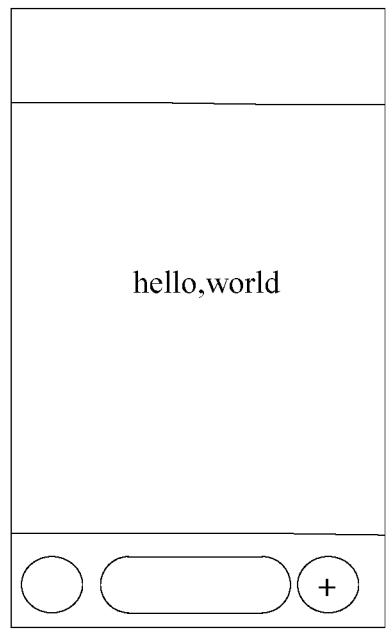
FIG. 14
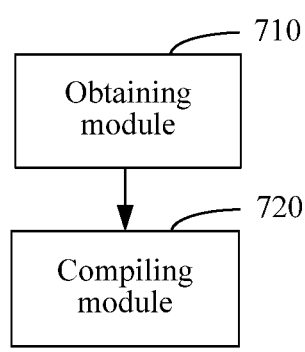
FIG. 15

# METHOD FOR COMPILING PAGE DATA, METHOD, DEVICE AND STORAGE MEDIUM FOR PAGE RENDERING

CROSS-REFERENCE TO RELATED APPLICATIONS

This application is a U.S. national stage application under 35 U.S.C. § 371 of International Patent Application No. PCT/CN2017/108909 filed on Nov. 11, 2017, which claims priority from Chinese Patent Application No. 201610975743.X, filed in the Chinese Patent Office on Nov. 7, 2016 and entitled "PAGE DATA COMPILING METHOD AND APPARATUS, AND PAGE RENDERING METHOD AND APPARATUS," the disclosures of which are incorporated herein by reference in their entireties.

BACKGROUND

1. Field

This application relates to the field of computer technologies, and in particular, to a page data compiling method, a page rendering method, apparatuses, and a storage medium.

2. Description of Related Art

With the development of computer technologies, a user may install various application programs in a terminal, and a page is presented in the application program or a page is presented by using a browser to browse the page and obtain content that interests the user.

SUMMARY

According to an embodiment, there is provided a page data compiling method, the method being performed by a server, and the method including obtaining initial page structure data that is generated using an extended markup language, parsing the initial page structure data to generate scripting language page data comprising a page generation code and a data variable set, an input to the page generation code being a current data set that is determined according to the data variable set, and an output of the page generation code being a node tree matching the input current data set, and sending the scripting language page data to a terminal so that the terminal determines the current data set according to the data variable set, determines the matching node tree according to the current data set and the page generation code in the scripting language page data, and displays a page according to the node tree.

According to another embodiment, there is provided a page rendering method, performed by a terminal, the method including obtaining scripting language page data comprising a page generation code and a data variable set, an input to the page generation code being a current data set that is determined according to the data variable set, and an output of the page generation code being a node tree matching the current data set. The method includes determining, according to the current data set and the page generation code in the scripting language page data, the node tree matching the current data set, obtaining page data, determining the current data set according to the page data and the data variable set, converting the node tree into standard structure data for generating a view, and displaying a page according to the standard structure data.

According to another embodiment, there is provided a page data compiling apparatus including at least one memory configured to store program code and at least one processor configured to access the at least one memory and operate according to the computer program code. The computer program code including obtaining code configured to cause the at least one processor to obtain initial page structure data that is generated using an extended markup language, and compiling code configured to cause the at least one processor to parse the initial page structure data to generate scripting language page data comprising a page generation code and a data variable set, an input to the page generation code being a current data set that is determined according to the data variable set, and an output of the page generation code being a node tree matching the input current data set, and send the scripting language page data to a terminal so that the terminal determines the current data set according to the data variable set, determines the matching node tree according to the current data set and the page generation code in the scripting language page data, and displays a page according to the node tree.

BRIEF DESCRIPTION OF THE DRAWINGS

FIG. 13 is a program code of a node tree generated after the update according to an example embodiment.

FIG. 14 is a schematic diagram of a page displayed after the update according to an embodiment.

FIG. 15 is a structural block diagram of a page data compiling apparatus according to an embodiment.

DESCRIPTION OF EMBODIMENTS

In an embodiment, a page is presented by using a front-end template or a backend template. The front-end template or the backend template often includes page data compiled by using extended markup syntax. If the front-end template is used for implementation, during page presentation, extended markup language page data and scripting language parsing data need to be loaded. The scripting language parsing data is used to parse the extended markup language page data to present a page. Each time when a page is loaded in the front-end template, the scripting language parsing data needs to be loaded to parse the extended markup language page data, which is an inefficiency way of page loading. If the backend template is used for implementation, all page data compiled by using the extended markup syntax is directly parsed on a backend into final view standard data. Consequently, a presented page is fixed and cannot be updated with dynamic data on a front end.

The following embodiments provide a page data compiling method, a page rendering method, apparatuses, and a storage medium, so that page data generated through compiling improves efficiency and allows flexibility in presenting a page. The foregoing page data compiling method and the page rendering method are applicable to a system architecture shown in FIG. 1.

Figure 1:
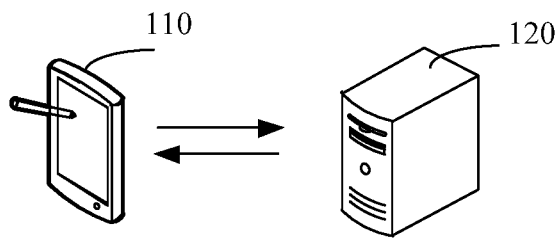
FIG. 1 is a diagram of an application environment for running a page data compiling method and a page rendering method according to an embodiment.

FIG. 1 illustrates an application environment that may include a terminal 110 and a server 120. The terminal 110 communicates with the server 120 using a network. The terminal 110 may be a smartphone, a tablet computer, a notebook computer, a desktop computer, or the like, but is not limited thereto. The server 120 compiles initial page structure data generated by using an extended markup language to generate scripting language page data. The scripting language page data is sent to the terminal 110 so that the terminal 110 displays a corresponding page according to the scripting language page data. The compiling of the initial page structure data is configured to be performed by the server 120. Accordingly, the terminal does not need to parse the extended markup language page data each time it loads a page, thereby reducing load on the terminal 110 and improving efficiency of presenting the page. In addition, the scripting language page data includes a page generation code. The generation code is executed to output a node tree that matches an input data variable set, and different node trees may be obtained according to different inputs to continuously update the page.

Figure 2:
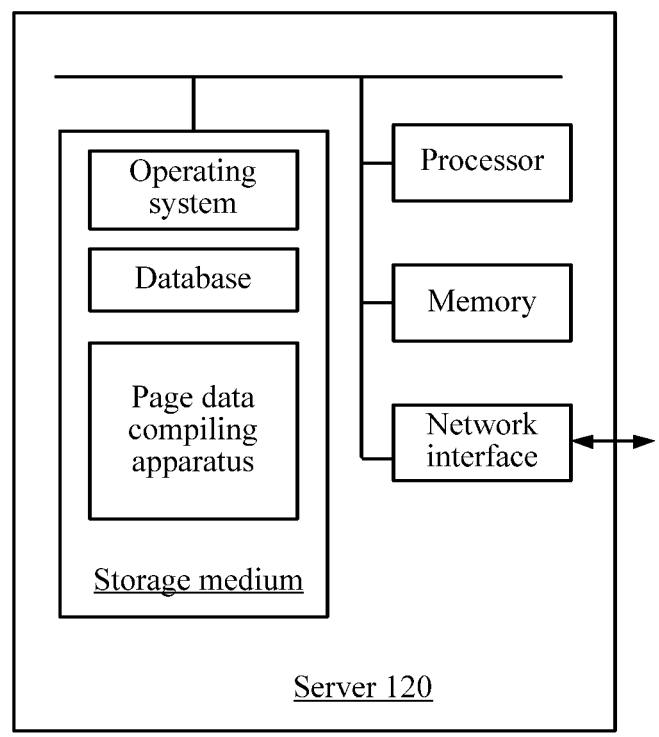
FIG. 2 is a diagram of an internal structure of a server in FIG. 1 according to an embodiment.

An internal structure of the server 120 is shown in FIG. 2. The server 120 includes a processor, a storage medium, a memory, and a network interface that are connected by using a system bus. The storage medium of the server 120 stores an operating system, a database, and a page data compiling apparatus. The database is configured to store data, for example, initial page structure data and scripting language page data. The server 120 is configured to perform a page data compiling. The processor of the server 120 is configured to provide computing and control capabilities to support running of the server 120. The memory of the server 120 provides an environment for running of the page data compiling apparatus in the storage medium. The network interface of the server 120 is configured to connect to and communicate with the terminal 110 by using the network. For example, the network interface allows the server 120 to send the scripting language page data to the terminal 110.

The structure shown in FIG. 2 is merely a block diagram of a partial structure related to the solutions in this application and is not limited thereto. A specific server may include more or fewer components than those shown in the figure, some components may be combined, or a different component may be used.

Figure 3:
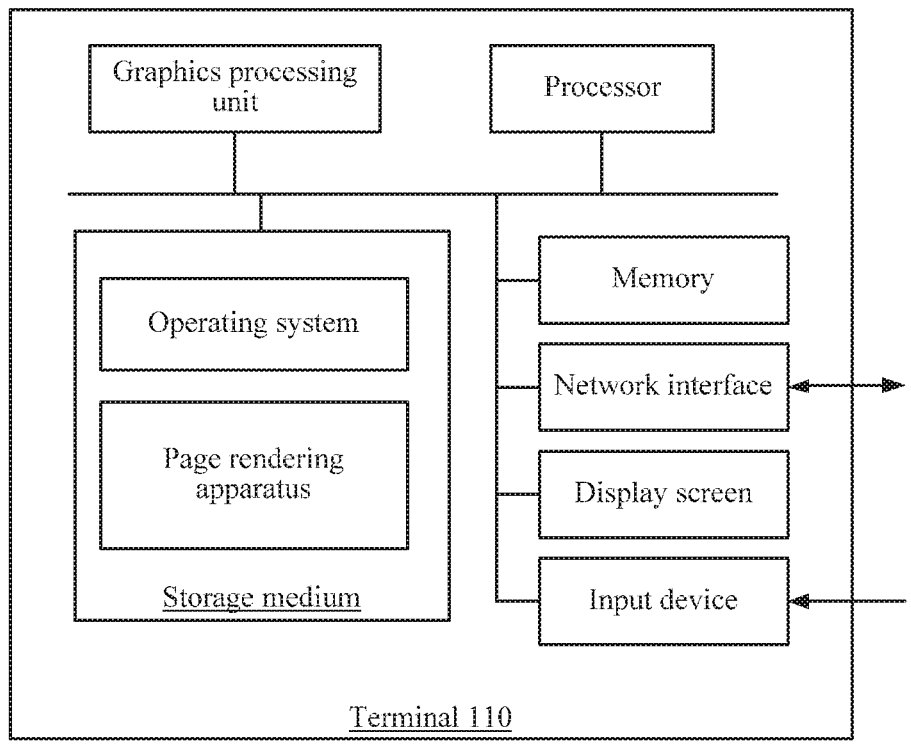
FIG. 3 is a diagram of an internal structure of a terminal in FIG. 1 according to an embodiment.

In an embodiment, an internal structure of the terminal 110 is shown in FIG. 3. The terminal 110 includes a processor, a graphics processing unit, a storage medium, a memory, a network interface, a display screen, and an input device that is connected to a system bus. The storage medium of the terminal 110 stores an operating system, and may further include a page rendering apparatus. The apparatus is configured to implement a page rendering code applicable to the terminal. The processor is configured to provide computing and control capabilities to support running of the terminal 110. In the terminal 110, the graphics processing unit is configured to provide at least display interface drawing capability for page rendering. The memory provides an environment of running the page rendering apparatus in the storage medium, and the network interface is configured to communicate with the server 120 using a network. For example, the terminal 110 may send a download request to the server 120 and receive scripting language page data using the network. The display screen is configured to display an application interface and the like. The input device is configured to receive a command or data entered by a user. The terminal 110 may be a touchscreen. The structure shown in FIG. 3 is merely a block diagram of a partial structure related to the solutions in this application, and is not limited thereto. A specific terminal may include more or fewer components than those shown in the figure, some components may be combined, or a different component may be used.

Figure 4:
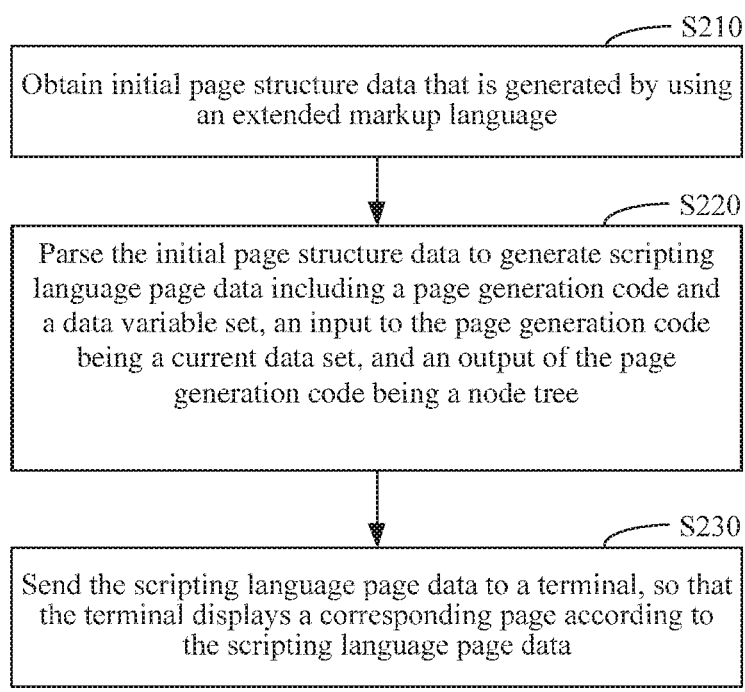
FIG. 4 is a flowchart of a page data compiling method according to an embodiment.

A page data compiling method performed by the server in the application environment is shown in FIG. 4.

In step S210, the server obtains initial page structure data that is generated by using an extended markup language.

Specifically, the extended markup language is a text code for combining a text and other text related information, and presenting a document structure and data processing details. The extended markup language is a user-defined markup language that is extended based on the Extensible Markup Language (XML). An extension is performed based on the XML to form a set of user-defined markup voices, and the user-defined markup voice may be referred to as an extended markup voice. In an embodiment, a syntax of the extended markup language may be defined to form a set of template languages. The functions of a template language may include a condition control, a fixed-length cycle, a user-defined reusable fragment, a complete rvalue expression support, and data types support, such as an immediate character string 'somestring' and an immediate array [1, 2, 3]. The page structure data is data including basic view element data, condition control data, expression data, array traversal data, and the like. The page structure data may include different sets of data depending on a page that need to be presented and may be implemented using different combinations of data to present different pages. The initial page structure data generated by using the extended markup language may flexibly and conveniently describe a page structure by using a user-defined syntax structure. The extended markup language in this embodiment is a rendering independent markup language, and a rendering layer may be a webview or may be a canvas.

In step S220, the server generates a corresponding scripting language page data based on a parsed initial page structure data to generate the corresponding scripting language page data, the scripting language page data including a page generation code and a data variable set. The page generation code generates the scripting language page data based on an input being a current data set determined according to the data variable set and an output being a node tree matching the input current data set.

Specifically, the initial page structure data often includes different labels, and each label has data such as a label attribute and label content. The label attribute may be a control attribute and the label content may include an expression, text content, and the like. The label attribute is used to modify the label, for example, the label attribute defines a style of the label and required data. The label includes multiple elements, and the elements included in the labels forming the initial page structure data are analyzed to obtain data processing logic to convert data that are carried in each label into a current data set as an input to the page generation code. The page generation code outputs a node tree as an output to obtain a corresponding scripting language page data. A scripting language is an explanatory programming language, such as a JavaScript scripting language or a VBScript scripting language, and a specific type of the scripting language that is not limited hereto. The data variable set is a set of all variables that need to be transmitted to the page generation code during page presentation, and a variable in the initial page structure data may be extracted to form the data variable set. During page presentation, an operation may be performed on a page to obtain dynamic data by assigning a value to a variable in the data variable set to obtain the current data set. Then, the current data set is input into the page generation code to obtain the node tree corresponding to the current data set to update the page. For example, a button on the page may be pressed to obtain the current data and update data presented on the page with the current data. The node tree is a tree data structure using an element in the initial page structure data as a node, and showing a top-down relationship between a parent node and a subnode. After the initial page structure data is analyzed and code rendering is performed, the page generation code outputs the node tree as an output. Therefore, on a front end (a client of a terminal), the node tree matching the current data set may be automatically output according to the input current data set. The node tree is a data structure that may be parsed and in which a node relationship exists. Therefore, the terminal does not need to perform parsing. When the node tree is obtained on the front end, the node tree may be directly converted into a standard data structure that may be parsed on the front end and in which the node relationship is carried to rapidly perform page rendering.

The extended markup language carries user-defined syntax in a running environment. The server may compile the extended markup language into a scripting language. For example, the JavaScript scripting language may be used as a target machine language to generate code that removes a limitation to an environment while running a page on a terminal of a client. In addition, the extended markup language is parsed in advance to generate the scripting language page data, thereby avoiding a problem that user-defined syntax needs to be parsed on the front end each time the page is loaded and improving page presentation efficiency.

In step S230, the server sends the scripting language page data to the terminal so that the terminal determines the current data set according to the data variable set, and determines the matching node tree according to the current data set of the scripting language page data. Then, the terminal displays a corresponding page according to the node tree.

Specifically, the matching may be performed between the scripting language page data and different page identifiers, application identifiers, upload user identifiers, and the like. An association relationship is established to obtain corresponding target scripting language page data according to identifier information in a page data obtaining request sent by the terminal, and the server sends the target scripting language page data to the terminal. Alternatively, the server may generate new scripting language page data and then actively send the new scripting language page data to the terminal based on a user-defined sending rule. For example, the server may periodically send the new scripting language page data to the terminal. After the terminal receives scripting language page data, because the scripting language page data is generated according to the page generation code, the corresponding node tree may be generated according to the page generation code. Subsequently, the node tree is converted into a final data structure for generating a view, and rendering is performed to display the corresponding page. The displayed page may be a page in an application running on an operating system or may be a page running based on a browser.

In this embodiment, the initial page structure data generated by using an extended markup language is obtained. The initial page structure data is parsed to generate the corresponding scripting language page data. The scripting language page data may be include a data variable set, which is input to page generation code. Then, the page generation code outputs the node tree matching the input current data set. The scripting language page data is sent to a terminal so that the terminal displays a corresponding page according to the scripting language page data. The server performs parsing the initial page structure data so the terminal does not need to parse extended markup language page data each time it loads a page, thereby improving page presentation efficiency. In addition, the scripting language page data includes the node tree that is output by using the page generation code, which matches the current data set, and different node trees may be obtained according to different input current data sets to dynamically update a page.

Figure 5:
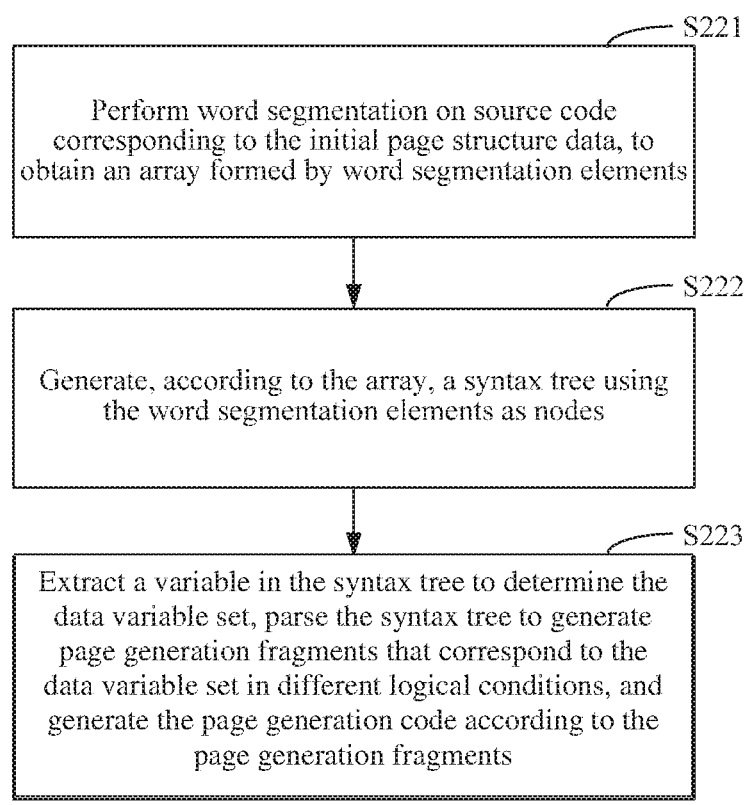
FIG. 5 is a flowchart of generating a page generation method according to an embodiment.

Referring to FIG. 5, the step S220 is further described in detail as provided below.

In step S221, the server performs a word segmentation on source code corresponding to the initial page structure data to obtain an array formed by word segmentation elements.

Figure 6:
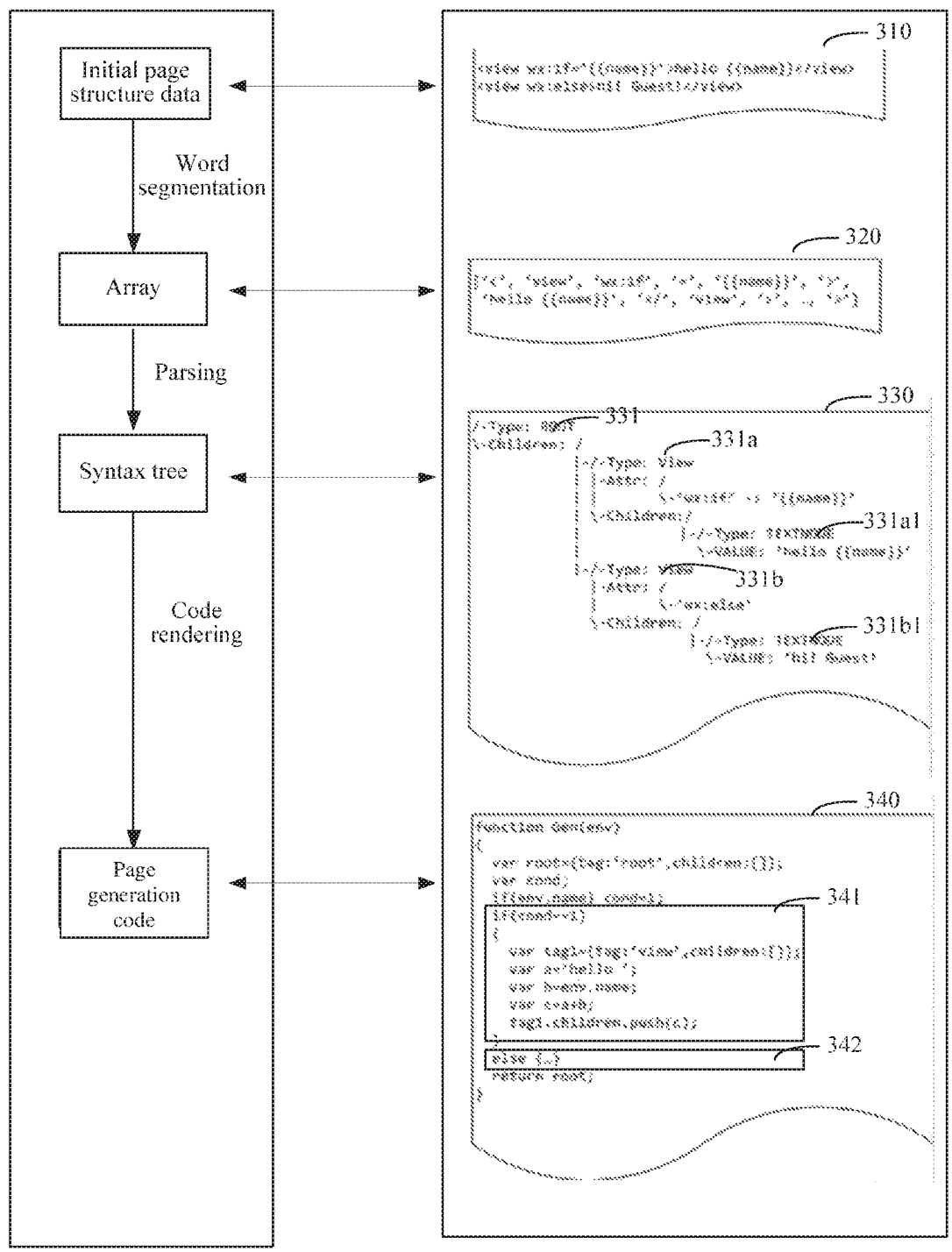
FIG. 6 is a schematic diagram of a process of a page generation method according to an example embodiment.

Specifically, the word segmentation is performed on the source code corresponding to the initial page structure data according to a user-defined syntax structure and a minimum element unit to obtain the word segmentation elements. The word segmentation elements form the array. FIG. 6 shows an array 320 that is obtained after word segmentation is performed on source code 310 corresponding to the initial page structure data.

In step S222, the server generates according to the array, a syntax tree using the word segmentation elements as nodes.

Specifically, the word segmentation elements may be parsed according to the user-defined syntax structure to obtain the syntax tree using the word segmentation elements as nodes, where only a particular element may be used as a node, for example, a label node or a text node. Whether each word segmentation element may be used as the node is determined according to a specific content of the word segmentation element. A node relationship between the word segmentation elements is determined according to node attribute information, such as a control attribute and positions at which the word segmentation elements appear. For example, a complete label includes a start label and an end label. First, the word segmentation elements are searched for elements forming a complete label and a complete label is used as a label node. Then, searching for attribute information is performed between the start label and the end label that correspond to the complete label as attribute information corresponding to the current label node. Next, searching for a character string and a character string expression is performed between the start label and the end label, and the character string or the character string expression found based on the search is used as a text subnode, which corresponds to the current label node, to finally form a syntax tree. FIG. 6 shows a syntax tree 330 corresponding to the array 320. Two subnodes 331a and 331b are included below a root node 331. The subnode 331a includes another subnode 331a1, and the subnode 331b includes subnode 331b1.

In step S223, a variable in the syntax tree is extracted to determine the data variable set. The syntax tree is parsed to generate page generation fragments that correspond to the data variable set in different logical conditions and to generate the page generation code according to the page generation fragments.

Specifically, all variables having different names that exist in the syntax tree are combined to generate the data variable set, where an order of the variables may be user-defined. The variables in the data variable set are updated according to data or an instruction imported on the front end. When data in the data variable set satisfies different logical conditions, for example, a node or an array corresponding to a control attribute, nodes are traversed, and different subnodes are mapped to correspond to different page generation fragments. In a control logical condition, the syntax tree 330 shown in FIG. 6 corresponds to a first page generation fragment 341 when a variable is true, that is, a name is true. For example, the name being "true" may be indicated by a value "1." The syntax tree 330 corresponds to a second page generation fragment 342 when a variable is false, that is, a name is false. The name being "false" may be indicated by a value "0" or anything other than "1." For a node including a condition control attribute, a unique number is allocated to each node, for example, in FIG. 6, cond==1 indicates that the condition control of a node is 1, and different numbers may be allocated to other nodes corresponding to page generation fragments.

In this embodiment, the syntax tree is first generated through parsing. The syntax tree hierarchically describes a relationship between elements. The corresponding page generation fragments in the different logical conditions may be generated according to the syntax tree to finally generate the page generation code.

Figure 7:
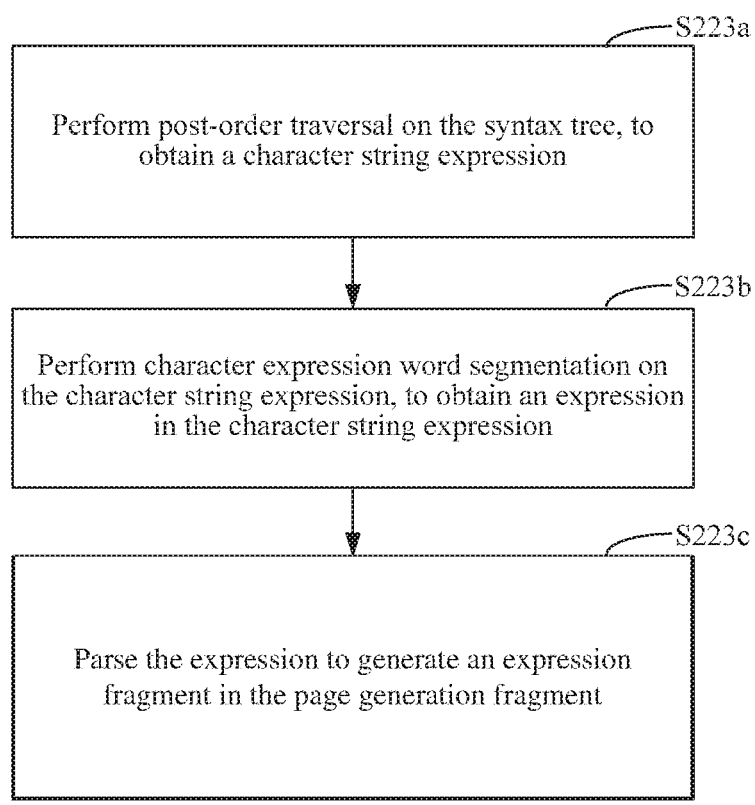
FIG. 7 is a flowchart of generating an expression fragment according to an embodiment.

In an embodiment, as shown in FIG. 7, In step S223a the server performs a post-order traversal on the syntax tree to obtain a character string expression.

Figure 8:
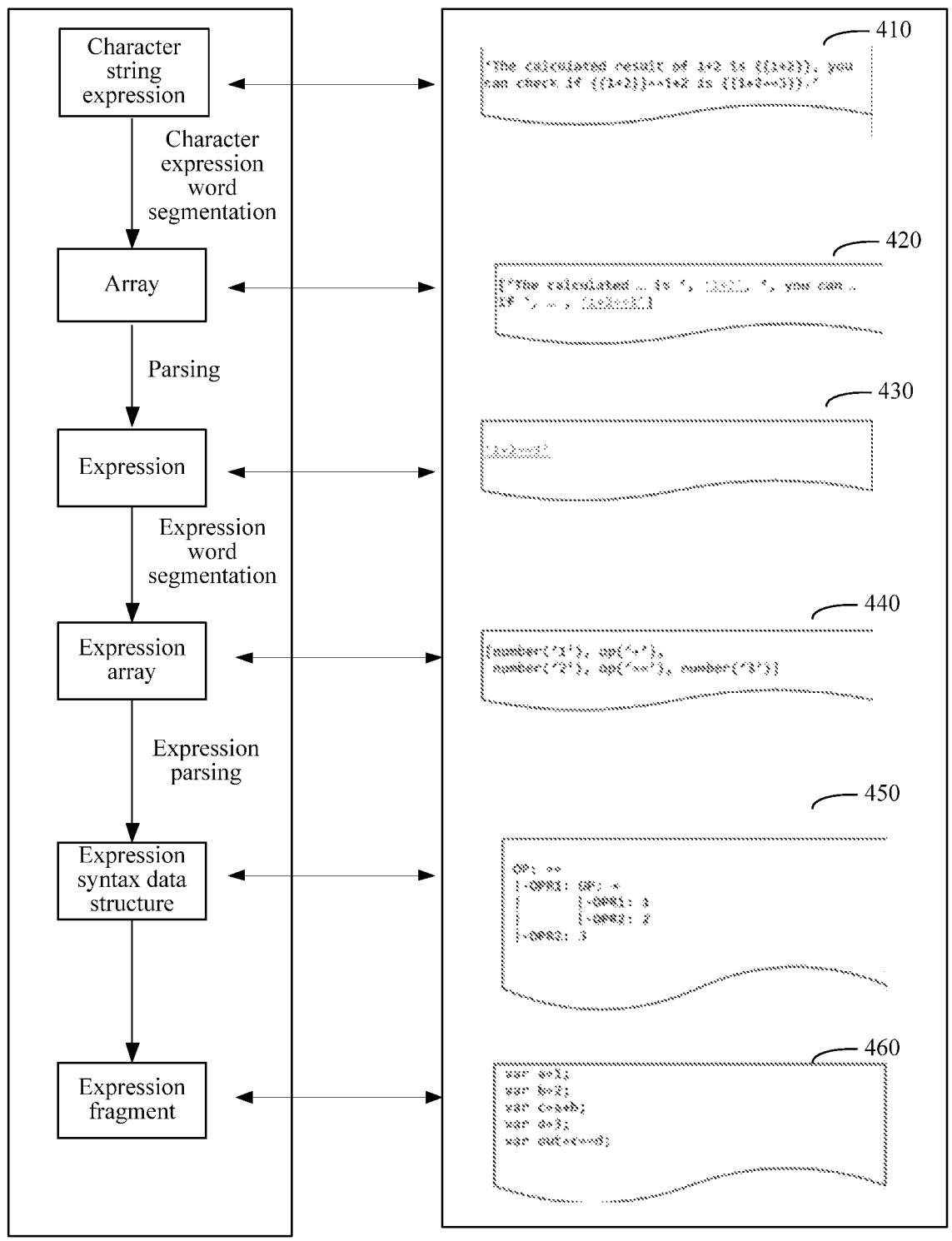
FIG. 8 is a schematic diagram of a process of generating an expression fragment according to an example embodiment.

Specifically, the post-order traversal means that a left subtree is traversed first, then a right subtree is traversed, and finally a root node is traversed. During the traversal, the character string expression corresponding to a text node is obtained. In an example embodiment, a character string expression 410 is obtained as shown in FIG. 8.

In step S223b, a word segmentation based on the character string expression is performed to obtain an array of the character string expression.

Specifically, a character string and an expression are identified according to a syntax structure feature. The character string in the character string expression is differentiated with the expression to obtain one or more character strings or one or more expressions to form an array. For example, in FIG. 8, an array 420 is an array generated after the word segmentation is performed on the character string expression 410. Next, as shown in FIG. 8, the code rendering is performed on an expression 430.

In step S223c, the expression is parsed to generate an expression fragment in the page generation fragment.

Specifically, the word segmentation may be performed on the expression according to a user-defined syntax structure feature to obtain a basic element corresponding to the expression to form an expression array. A structural analysis is performed on the expression array to obtain an expression syntax data structure. An expression fragment is generated according to the expression syntax data structure. The expression fragment corresponds to a scripting language code generated after the expression in the markup language is parsed. As shown in FIG. 8, an expression word segmentation is performed on the expression 430 to obtain an expression array 440 and parsing is performed on the expression array 440 to obtain an expression syntax data structure 450, and finally, a corresponding expression fragment 460 is generated.

In an embodiment, the scripting language page data is used to receive dynamic data on the front end to determine the variables in the data variable set according to the dynamic data to obtain the current data set, and input the current data set to the page generation code to generate the node tree.

Specifically, the dynamic data may be data obtained by the terminal before the page is presented, or may be data obtained by the terminal after the page is presented. The data obtained by the terminal may be data obtained in response to an operation on a control on the page. An input box control or an operation button control on the page corresponds to a variable in the data variable set. In response to the operation on the input box control and in response to the operation on the operation button control, the terminal obtains data and assigns a value to a corresponding variable in the data variable set to obtain the current data set. There may be one or more variables in the data variable set. The current data set is input into the page generation code in the scripting language page data to output the node tree matching the current data set. The page is rendered according to the node tree and the page may be dynamically updated according to different current data sets. When rendering is performed on the front end, the output node tree obtained after the initial page structure data is compiled. Therefore, the node tree does not need to be parsed and may be directly converted into standard structure data for generating a view, and the corresponding page may be rapidly generated to increase the speed of the page generation. In addition, the page may be updated in real time according to the dynamic data to display periodically updated view of the page.

In an embodiment, the node tree is used to generate the standard structure data for generating a view on the front end, so that the page corresponding to the node tree is displayed on the front end according to the standard structure data.

Specifically, parent nodes and subnodes corresponding to the parent nodes may be rapidly generated according to the node tree. The node tree may be converted according to a hierarchy between the nodes into the standard structure data for generating a view. For example, Hyper Text Markup Language (HTML) language data may be used to generate the page corresponding to the node tree and may be displayed on the front end according to the standard structure data.

In an embodiment, the page data compiling method provided in this application may be further used to compile page data of a sub application of a parent application. In this embodiment, the initial page structure data is sub application initial page structure data and is used to describe a sub application page structure in a parent application running on an operating system.

Specifically, a sub application is an application program that runs on the parent application, and the sub application may be downloaded, enabled, streamed, and closed by using the parent application. The parent application may be a social application, a specific application dedicated to supporting the sub application, a file management application, a mail application, a game application, or the like. The social application includes an instant messaging application, a social network service (SNS) application, a live broadcast application, or the like. The sub application may an application that is implemented in an environment provided by the parent application, and the sub application may be a social application, a file management application, a mail application, a game application, or the like. A page in each sub application has corresponding initial page structure data used to describe a sub application page structure. The initial page structure data corresponding to each sub application is compiled by the server into scripting language page data, and the initial page structure data, that is, source code, is not exposed to a client. Therefore, forging and tampering of the page in the sub application are prevented, thereby improving application security.

In an embodiment, the initial page structure data corresponds to a sub application page identifier, and the page data compiling method provided in this application further includes: establishing an association relationship between the sub application page identifier and the scripting language page data that corresponds to the initial page structure data, receiving a current sub application page identifier sent by the terminal, and obtaining, according to the association relationship, target scripting language page data corresponding to the current sub application page identifier, and sending the target scripting language page data to the terminal. The current sub application page identifier may be carried in a page data obtaining request sent by the terminal.

Specifically, each sub application may have multiple pages. When uploading the initial page structure data, a developer adds the sub application page identifier matching each page, and after the scripting language page data corresponding to the initial page structure data is generated, the relationship between the scripting language page data and the sub application page identifier is established to facilitate presentation of a page of the sub application. The terminal then downloads the corresponding target scripting language page data by using the sub application page identifier to present the corresponding page. It may be understood that, in addition to the sub application page identifier, when the server stores initial page structure data of multiple sub applications, the initial page structure data may include sub application identifier matching each sub application.

In an embodiment, the page data compiling method provided in the this application further includes: obtaining application program code data corresponding to the parent application and packaging scripting language page data corresponding to the sub application initial page structure data into the application program code data Specifically, the scripting language page data corresponding to the sub application initial page structure data is packaged into the application program code data of the parent application. When downloading the parent application, a user may obtain page data of each sub application to present a page of a corresponding sub application, and the page of the sub application may be directly opened in the parent application without jumping to a browser, thereby improving page presentation convenience. In addition, when each page of the sub application is presented, the page data is already stored in the terminal without a need of obtaining the page data from the server through network transmission, thereby improving page presentation efficiency.

Figures 9, 10:
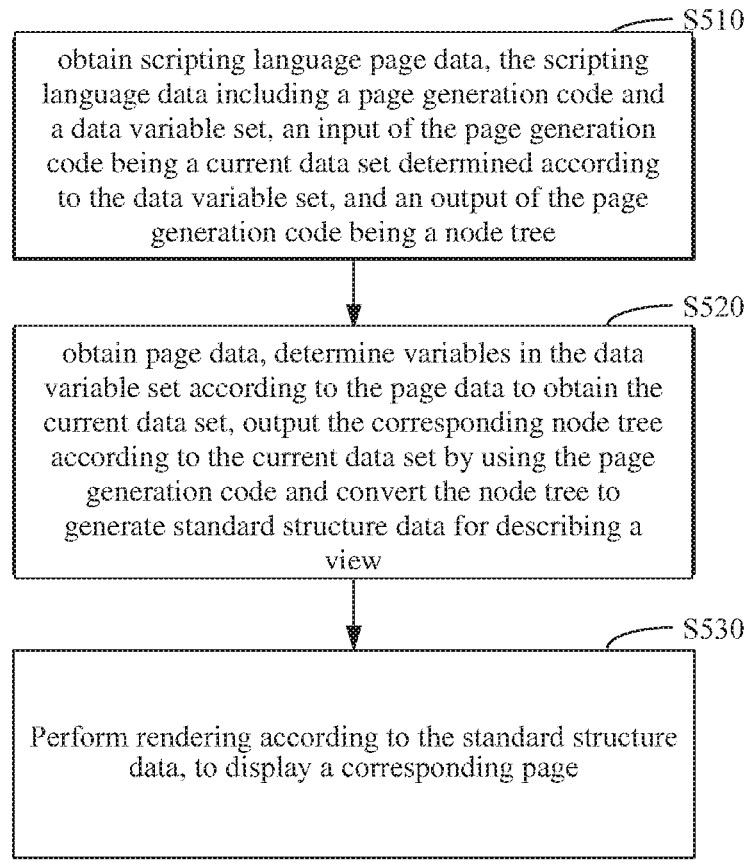
FIG. 9 is a flowchart of a page rendering method according to an embodiment.
FIG. 10 is a program code of a generated node tree according to an example embodiment.

In an embodiment, as shown in FIG. 9, a page rendering method is performed by the terminal in the application environment shown in FIG. 1.

For example, in step S510, the terminal obtains scripting language page data, the scripting language page data including a page generation code and a data variable set, an input of the page generation code being a current data set determined according to a data variable set, and an output of the page generation code being a node tree matching the current data set, and determines, according to the current data set in the scripting language page data, the node tree matching the current data set.

Specifically, a scripting language is an explanatory programming language, such as a JavaScript scripting language or a VBScript scripting language, and a specific type of the scripting language is not limited hereto. The scripting language page data is data that is compiled by using a scripting language and used to generate a page structure. The scripting language page data may include an extended user-defined syntax. Therefore, a client may directly parse the scripting language page data, for example, by parsing the scripting language page data by using a browser or a webview.

The page generation code includes page generation fragments that correspond to the data variable set in different logical conditions, so that a corresponding target page generation fragment may be obtained according to logical conditions met by different data variable sets, and a corresponding node tree may be output according to the target page generation fragment. The data variable set is a set of all variables that need to be transmitted to the page generation code during page presentation. During page presentation, an operation may be performed on a page to obtain dynamic data to assign a value to a variable in the data variable set and to update a page. For example, a button on the page may be pressed to obtain current data bound with the button, and update data presented on the page into current data. The node tree is a tree data structure using a markup language or an extended markup language element as a node, and uses a top-down relationship between a parent node and a subnode. The matching node tree may be automatically output on a front end according to an input. The node tree is a data structure that may be completely parsed and in which a node relationship exists. Therefore, the terminal does not need to perform parsing. When the node tree is obtained on the front end, the node tree may be directly converted into a standard data structure that may be parsed on the front end and in which the node relationship is carried to rapidly perform page rendering. The page data uses a scripting language to avoid a problem in which a user-defined syntax of a markup language needs to be parsed on the front end each time when a page is loaded, and thereby, improving the efficiency of page presentation.

In step S520, the page data is obtained to determine the current data set according to the page data and the data variable set, determine a corresponding node tree that is output according to the current data set by using the page generation code, and convert the node tree into standard structure data for generating a view.

Specifically, the page data may be default data or may be data extracted from a currently running application or a browser, for example, a current login user name, and may include one or more pieces of data, or may be response data obtained after an event response is made. The page data may be mapped into a variable in the data variable set in a one-to-one manner to form the current data set. The current data set is processed by the page generation code. A corresponding target page generation fragment is obtained according to a current logical condition met by the current data set to output the target node tree corresponding to the current data set. Next, the target node tree is converted to generate the standard structure data for generating a view, for example, generating HTML data through conversion.

In a specific embodiment, before a current page is presented, default data or a name may be a null, and a node tree may be output according to the name as shown in FIG. 10.

In step S530, the terminal may display a corresponding page according to the standard structure data.

Figure 11:
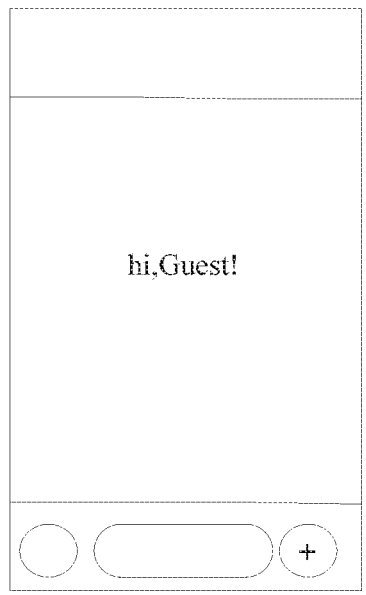
FIG. 11 is a schematic diagram of a page corresponding to the node tree in FIG. 10 according to an embodiment.
Figure 12:
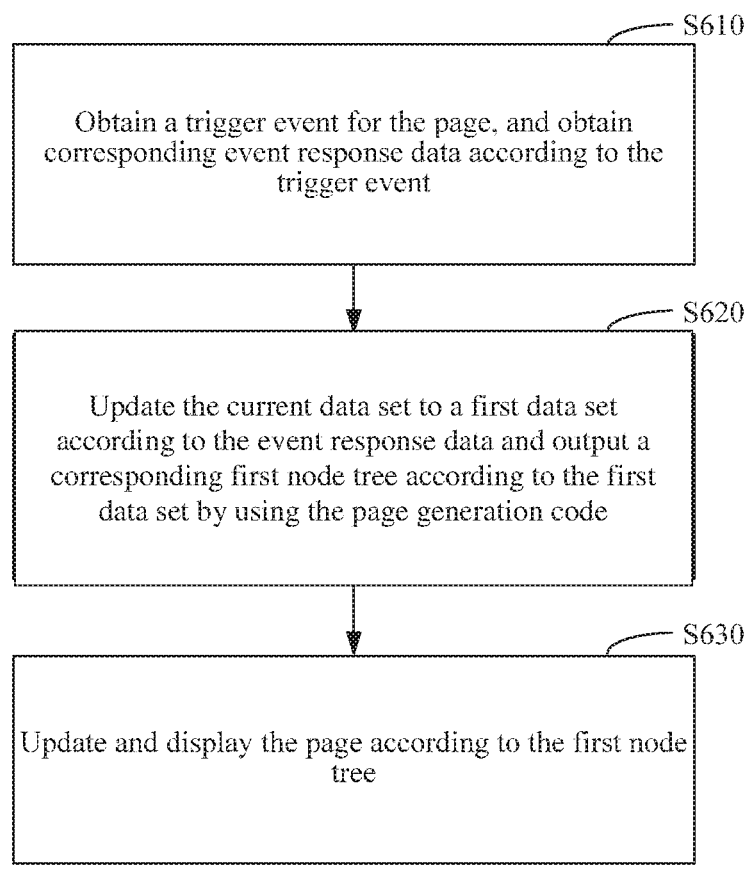
FIG. 12 is a flowchart of updating and displaying a page according to an embodiment.

Specifically, the standard structure data may be directly parsed to display the corresponding page. FIG. 11 is a schematic diagram of the displayed page.

In this embodiment, the scripting language page data is obtained by the terminal, the scripting language page data including a page generation code and a data variable set, an input of the page generation code being a current data set determined according to the data variable set, and an output generated by the page generation code outputting a node tree. The page data is obtained by the terminal in which variables in the data variable set are determined according to the page data to obtain the current data set, the corresponding node tree is output according to the current data set by using the page generation code. The node tree is converted to generate standard structure data for generating a view and rendering is performed according to the standard structure data to display a corresponding page. A client obtains compiled scripting language page data, and the terminal does not need to parse extended markup language page data each time after loading a page, thereby improving the efficiency of presenting a page. In addition, if different page data is obtained by the server, to the server may obtain different node trees, so as to dynamically update the page.

In an embodiment, the scripting language page data is sub application scripting language page data, and is used to describe a sub application page structure in a parent application running on an operating system.

Specifically, a sub application is an application program that runs by depending on the parent application, and the sub application may be downloaded, enabled, run, and closed by using the parent application. The parent application may be a social application, a specific application dedicated to supporting the sub application, a file management application, a mail application, a game application, or the like. The social application includes an instant messaging application, an SNS application, a live broadcast application, or the like. The sub application is an application that may be implemented in an environment provided by the parent application, and the sub application may be a social application, a file management application, a mail application, a game application, or the like. A page in each sub application has corresponding scripting language page data used to describe a sub application page structure. The scripting language page data corresponding to each sub application may be scripting language page data generated after the initial page structure data is compiled by the server, and the initial page structure data, that is, source code, is not exposed to a client. Therefore, forging and tampering of the page in the sub application are prevented, thereby improving application security. The initial page structure data is generated through compiling by using the extended markup language, and the initial page structure data generated by using the extended markup language may flexibly and conveniently describe a page structure by using a user-defined syntax structure.

In an embodiment, step S410 includes sending a parent application download request to a server, receiving application program code data corresponding to the parent application and returned by the server, and extracting sub application scripting language page data from the application program code data.

Specifically, the scripting language page data is packaged into the application program code data of the parent application. When downloading the parent application, a user may obtain page data of each sub application to present a page of a corresponding sub application, and the page of the sub application may be directly opened in the parent application without jumping to a browser, thereby improving page presentation convenience. In addition, when each page of the sub application is presented, the page data is already stored in the terminal without a need of obtaining the page data from the server through network transmission, thereby improving page presentation efficiency.

Step S410 may also include sending a page data obtaining request to a server, where the page data obtaining request carries a current sub application page identifier so that the server obtains target scripting language page data corresponding to the current sub application page identifier, and receiving the scripting language page data returned by the server.

Specifically, each sub application may have multiple pages, and the server may store scripting language page data corresponding to the multiple pages. To present a page of a sub application, the terminal needs to download corresponding target scripting language page data by using a sub application page identifier to present the corresponding page. It may be understood that, in addition to the sub application page identifier, when the server stores initial page structure data of multiple sub applications and when the page data obtaining request is sent, a sub application identifier may be included to differentiate between different sub applications. The page data obtaining request carries identifier information so that only a page that needs to be presented may be downloaded, thereby implementing flexible and convenient downloading of the page.

In an embodiment, in step S610, the server may obtain a trigger event of a page and obtain corresponding event response data according to the trigger event.

Specifically, each trigger event corresponds to a matching event response. An event type of the trigger event may be determined first, and then the event is processed using a logical code that is in a page logical code matching the event type to obtain the corresponding event response data.

In step S620, the server updates the current data set to a first data set according to the event response data and determines a corresponding first node tree that is output according to the first data set by using the page generation code.

Specifically, the event response data may be bound with a variable in the data variable set so that when event response data is different from data to which a value is previous assigned, the event response data is reassigned to a bound variable to update the current data set to the first data set. A change in the data set causes that an updated first node tree is output by using the page generation code. In a specific embodiment, on a page, "hi, guest" may be displayed the first time and a name, that is null. After a trigger event performed by a user on a button is received, an event response corresponding to the trigger event is obtained. The event response may be an update data response to change the name from null to "world," where a character string, for example, "hello," exists before the name so that a text node in the output node tree corresponds to "hello world."

FIG. 13 is a schematic diagram of the updated first node tree.

In step S630, the terminal updates and displays the page according to the first node tree.

Specifically, the first node tree is obtained after the node tree is updated and a new page corresponding to the first node tree is generated through rendering according to the first node tree to complete a dynamic update of the page.

FIG. 14 is a schematic diagram of an updated page according to a specific embodiment.

In this embodiment, an event response corresponding to an event may be user-defined, so that a value of a data variable is updated by using preset logic to generate a node tree after the update to render a new page. This conveniently updates the page.

In an embodiment, as shown in FIG. 15, a page data compiling apparatus may include one or more memories and one or more processors, the one or more memories storing one or more computer-readable instruction modules configured to be executed by the one or more processors, and the one or more computer-readable instruction modules includes an obtaining module 710 configured to obtain initial page structure data that is generated by using an extended markup language and a compiling module 720 configured to generate corresponding scripting language page data and a data variable set based on a parsed initial page structure data, wherein a page generation code generates the scripting language page data using an input of the page being a current data set determined according to a data variable set, and outputs a node tree matching the input current data set, and send the scripting language page data to a terminal so that the terminal determines the current data set according to the data variable set, determines the matching node tree according to the current data set, and displays a corresponding page according to the node tree.

Figure 16:
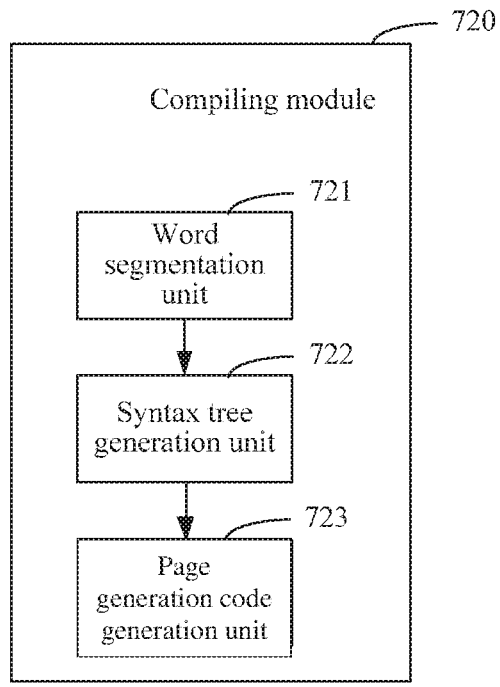
FIG. 16 is a structural block diagram of a compiling module according to an embodiment.

In an embodiment, as shown in FIG. 16, the compiling module 720 includes a word segmentation unit 721 configured to perform word segmentation on source code corresponding to the initial page structure data to obtain an array formed by word segmentation elements, a syntax tree generation unit 722 configured to generate, according to the array, a syntax tree using the word segmentation elements as nodes, and a page generation code generation unit 723 configured to extract a variable in the syntax tree to determine the data variable set. parse the syntax tree to generate page generation fragments that correspond to the data variable set in different logical conditions, and generate the page generation code according to the page generation fragments.

In an embodiment, the page generation code generation unit 723 is further configured to perform post-order traversal on the syntax tree to obtain a character string expression, perform character expression word segmentation on the character string expression to obtain an expression in the character string expression, and parse the expression to generate an expression fragment in the page generation fragment.

In an embodiment, the compiling module 720 is further configured to cause the terminal to obtain page data on a front end, determine the current data set according to the page data and the data variable set, input the current data set to the page generation code to generate the node tree, and display the corresponding page according to the node tree.

In an embodiment, the compiling module 720 is further configured to cause the terminal to convert, on a front end, the node tree into standard structure data for generating a view, and display, according to the standard structure data, the page corresponding to the node tree.

In an embodiment, the initial page structure data is sub application initial page structure data and is used to describe a sub application page structure in a parent application running on an operating system.

Figure 17:
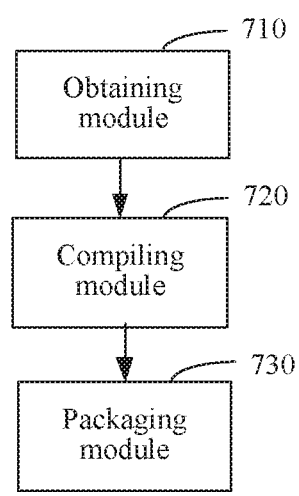
FIG. 17 is a structural block diagram of a page data compiling apparatus according to another embodiment.

In an embodiment, as shown in FIG. 17, the one or more computer-readable instruction modules further includes a packaging module 730 configured to obtain application program code data corresponding to the parent application and package scripting language page data corresponding to the sub application initial page structure data into the application program code data.

Figure 18:
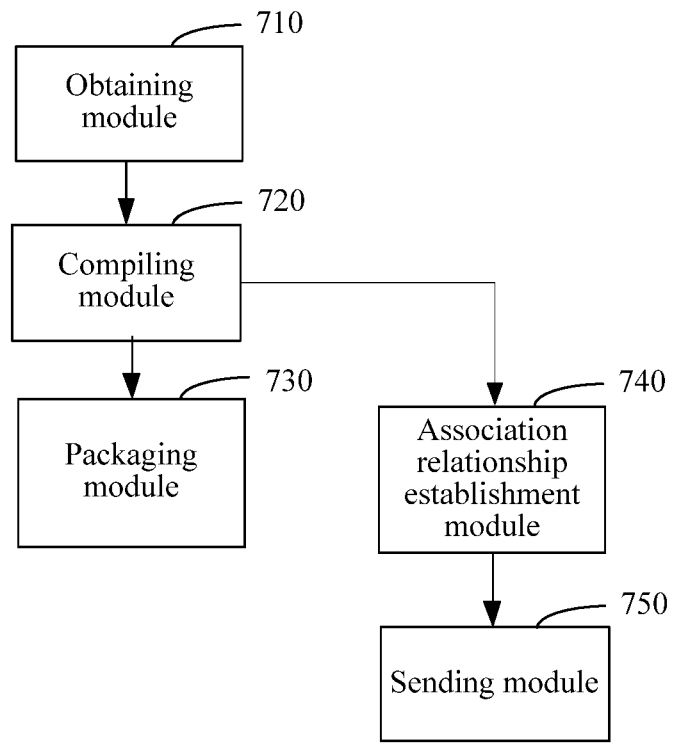
FIG. 18 is a structural block diagram of a page data compiling apparatus according to another embodiment.

In an embodiment, the initial page structure data corresponds to a sub application page identifier, and as shown in FIG. 18, the one or more computer-readable instruction modules further include an association relationship establishment module 740 configured to establish an association relationship between the sub application page identifier and the scripting language page data that corresponds to the initial page structure data and a sending module 750 configured to receive a page data obtaining request sent by the terminal, where the page data obtaining request carries a current sub application page identifier and obtain, according to the association relationship, the scripting language page data corresponding to the current sub application page identifier and send the scripting language page data to the terminal.

According to the structure shown in FIG. 2, an embodiment of this application further provides a hardware structure including one or more memories and one or more processors configured to implement functions of the foregoing page data compiling apparatus or method.

Figure 19:
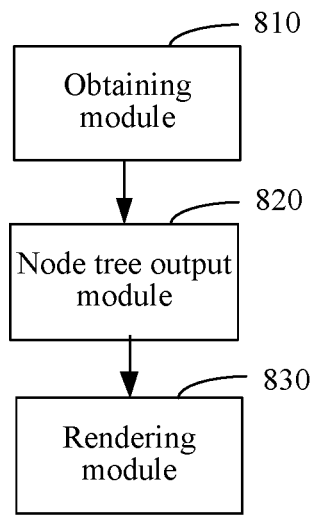
FIG. 19 is a structural block diagram of a page rendering apparatus according to an embodiment.

In an embodiment, as shown in FIG. 19, a page rendering apparatus includes one or more memories and one or more processors, the one or more memories storing one or more computer-readable instruction modules configured to be executed by the one or more processors, and the one or more computer-readable instruction modules including an obtaining module 810 configured to obtain scripting language page data, the scripting language page data including a page generation code and a current data set determined according to a data variable set as an input and an output of the page generation code being a node tree based on the current data set, a node tree output module 820 configured to obtain page data, determine the current data set according to the page data and the data variable set, determine a corresponding node tree that is output according to the current data set by using the page generation code, and convert the node tree into standard structure data for describing a view, and a rendering module 830 configured to display a corresponding page according to the standard structure data.

In an embodiment, the initial page structure data is sub application initial page structure data and is used to describe a sub application page structure in a parent application running on an operating system.

In an embodiment, the obtaining module 810 is further configured to send a parent application download request to a server and receive application program code data corresponding to the parent application and returned by the server, and extract sub application scripting language page data from the application program code data.

In an embodiment, the obtaining module 810 is further configured to send a page data obtaining request to a server, where the page data obtaining request carries a current sub application page identifier so that the server obtains scripting language page data corresponding to the current sub application page identifier, and receive the scripting language page data returned by the server.

Figure 20:
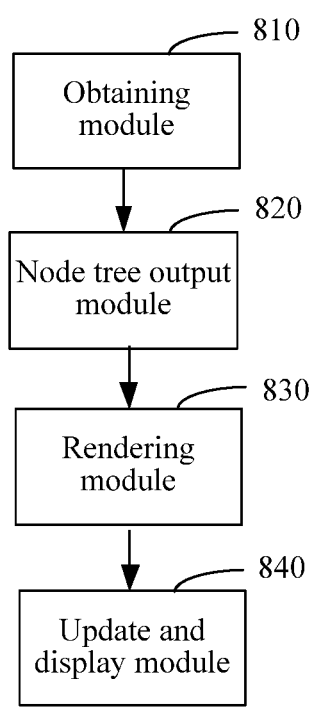
FIG. 20 is a structural block diagram of a page rendering apparatus according to another embodiment.

In an embodiment, as shown in FIG. 20, the one or more computer-readable instruction modules further include an update and display module 840 configured to obtain a trigger event for the page and obtain a corresponding event response data according to the trigger event, update the current data set to a first data set according to the event response data, determine a corresponding first node tree that is output according to the first data set by using the page generation code, and update and display the page according to the first node tree.

According to the structure shown in FIG. 2, an embodiment of this application further provides a hardware structure, including one or more memories, and one or more processors configured to implement functions of the foregoing page rendering apparatus or method.

An embodiment of this application further provides a non-volatile computer-readable storage medium, storing computer-readable instructions capable of causing at least one processor to perform the foregoing method. A person of ordinary skill in the art may understand that all or some of the processes in the method in the foregoing embodiments may be implemented by a computer program instructing relevant hardware. The program may be stored in a computer-readable storage medium. For example, in the embodiments of the present invention, the program may be stored in a storage medium of a computer system, and is executed by at least one processor in the computer system, to implement the processes including the foregoing method embodiments. The storage medium may be a non-volatile storage medium, for example, a magnetic disk, an optical disc, a read-only memory (ROM), or a random access memory (RAM).

Various technical features in the foregoing embodiments may be combined. For ease of description, possible combinations of various technical features in the foregoing embodiments are not limited herein.

The foregoing embodiments are merely several implementations of the embodiments of the present invention, which are described in a relatively specific and detailed manner. However, this should not be constructed as a limitation to the patent scope of the present disclosure. It should be noted that, a person of ordinary skill in the art may make several deformations and improvements without departing from the idea of the embodiments of the present invention. All such deformations and improvements fall within the protection scope of the embodiments of the present invention. Therefore, the protection scope of the patent of the embodiments of the present invention shall be subject to the appended claims.

What is claimed is:

1. A page data compiling method, the method being performed by a server, and the method comprising:
   obtaining initial page structure data that is generated using an extended markup language;
   parsing the initial page structure data to generate scripting language page data comprising a page generation code and a data variable set, an input to the page generation code being a current data set that is determined according to the data variable set, and an output of the page generation code being a node tree matching the input current data set; and
   sending the scripting language page data to a terminal so that the terminal determines the current data set according to the data variable set, determines the matching node tree according to the current data set and the page generation code in the scripting language page data, and displays a page according to the node tree.

2. The method according to claim 1, wherein the parsing the initial page structure data to generate scripting language page data and the data variable set comprises:
   performing a word segmentation on a source code corresponding to the initial page structure data to obtain an array formed by word segmentation elements;
   generating, according to the array, a syntax tree using the word segmentation elements as nodes;
   extracting a variable in the syntax tree to determine the data variable set;
   parsing the syntax tree to generate page generation fragments that correspond to the data variable set in different logical conditions; and
   generating the page generation code according to the page generation fragments.

3. The method according to claim 2, wherein the parsing the syntax tree further comprises:
   performing a post-order traversal on the syntax tree to obtain a character string expression;
   performing a character expression word segmentation on the character string expression
   to obtain an expression in the character string expression; and
   parsing the expression to generate an expression fragment in the page generation fragments.

4. The method according to claim 1, wherein the terminal further obtains page data on a front end, determines the current data set according to the page data and the data variable set, inputs the current data set to the page generation code, to generate the node tree, and displays the page according to the node tree.

5. The method according to claim 1, wherein the terminal further converts, on a front end, the node tree into standard structure data for generating a view, and displays, according to the standard structure data, the page corresponding to the node tree.

6. The method according to claim 1, wherein the initial page structure data is a sub application initial page structure data and is used to describe a sub application page structure in a parent application running on an operating system.

7. The method according to claim 6, wherein the method further comprises:
   obtaining application program code data corresponding to the parent application; and
   packaging the scripting language page data corresponding to the sub application initial page structure data into the application program code data.

8. The method according to claim 6, wherein the initial page structure data corresponds to a sub application page identifier, and the method further comprises:
   establishing an association relationship between the sub application page identifier and the scripting language page data that corresponds to the initial page structure data;

receiving a page data obtaining request sent by the terminal, wherein the page data obtaining request carries a current sub application page identifier; and obtaining, according to the association relationship, the scripting language page data corresponding to the current sub application page identifier; and sending the scripting language page data to the terminal.

9. A page rendering method, performed by a terminal, the method comprising:

obtaining scripting language page data comprising a page generation code and a data variable set, an input to the page generation code being a current data set that is determined according to the data variable set, and an output of the page generation code being a node tree matching the current data set;

determining, according to the current data set and the page generation code in the scripting language page data, the node tree matching the current data set;

obtaining page data;

determining the current data set according to the page data and the data variable set;

converting the node tree into standard structure data for generating a view; and displaying a page according to the standard structure data.

10. The method according to claim 9, wherein the initial page structure data is sub application initial page structure data and is used to describe a sub application page structure in a parent application running on an operating system.

11. The method according to claim 9, wherein the obtaining scripting language page data comprises:

sending a parent application download request to a server and receiving application program code data corresponding to the parent application from the server; and extracting sub application scripting language page data from application program code data corresponding to the parent application.

12. The method according to claim 9, wherein the obtaining scripting language page data comprises:

sending a page data obtaining request to a server, wherein the page data obtaining request carries a current sub application page identifier so that the server obtains scripting language page data corresponding to the current sub application page identifier; and receiving the scripting language page data from the server.

13. The method according to claim 9, wherein the displaying the page according to the standard structure data further comprises:

obtaining a trigger event for the page and obtaining corresponding event response data according to the trigger event;

updating the current data set to a first data set according to the event response data;

determining a corresponding first node tree that is output according to the first data set by using the page generation code; and updating and displaying the page according to the first node tree.

14. A page data compiling apparatus comprising:

at least one memory configured to store program code; and at least one processor configured to access the at least one memory and operate according to the computer program code, the computer program code comprising:

obtaining code configured to cause the at least one processor to obtain initial page structure data that is generated using an extended markup language; and compiling code configured to cause the at least one processor to:

parse the initial page structure data to generate scripting language page data comprising a page generation code and a data variable set, an input to the page generation code being a current data set that is determined according to the data variable set, and an output of the page generation code being a node tree matching the input current data set; and send the scripting language page data to a terminal so that the terminal determines the current data set according to the data variable set, determines the matching node tree according to the current data set and the page generation code in the scripting language page data, and displays a page according to the node tree.

15. The apparatus according to claim 14, wherein the compiling code further comprises:

a word segmentation code configured to cause the at least one processor to perform word segmentation on a source code corresponding to the initial page structure data to obtain an array formed by word segmentation elements;

a syntax tree generation code configured to cause the at least one processor to generate, according to the array, a syntax tree using the word segmentation elements as nodes; and a page generation code generation code configured to cause the at least one processor to extract a variable in the syntax tree to determine the data variable set, parse the syntax tree to generate page generation fragments that correspond to the data variable set in different logical condition, and generate the page generation code according to the page generation fragments.

16. The apparatus according to claim 15, wherein the page generation code generation code is further configured to cause the at least one processor to perform a post-order traversal on the syntax tree to obtain a character string expression, perform character expression word segmentation on the character string expression to obtain an expression in the character string expression, and parse the expression to generate an expression fragment in the page generation fragment.

17. The apparatus according to claim 14, wherein the compiling code is further configured to cause the at least one processor to cause the terminal to obtain page data on a front end, determine the current data set according to the page data and the data variable set, input the current data set to the page generation code to generate the node tree, and display the corresponding page according to the node tree.

18. The apparatus according to claim 14, wherein the compiling code is further configured to cause the at least one processor to cause the terminal to convert, on a front end, the node tree into standard structure data for generating a view, and display, according to the standard structure data, the page corresponding to the node tree.

19. A non-transitory computer-readable storage medium storing computer-readable instructions to cause at least one processor to perform the method according to claim 1.

20. A non-transitory computer-readable storage medium storing computer-readable instructions to cause at least one processor to perform the method according to claim 9.

* * * * *